US006546311B2

(12) United States Patent
Brown

(10) Patent No.: US 6,546,311 B2
(45) Date of Patent: Apr. 8, 2003

(54) INJECTION MOULDING SYSTEM AND METHOD THAT DETERMINE OPTIMUM INJECTION MOULDING CONDITIONS

(75) Inventor: Christopher Stephen Brown, Teddingdon (GB)

(73) Assignee: The Secretary of State for Trade and Industry in Her Majesty's Government of the United Kingdom of Great Britain and Northern Ireland, London (GB)

( * ) Notice: Subject to any disclaimer, the term of this patent is extended or adjusted under 35 U.S.C. 154(b) by 0 days.

(21) Appl. No.: 09/892,339

(22) Filed: Jun. 27, 2001

(65) Prior Publication Data

US 2002/0055806 A1 May 9, 2002

(51) Int. Cl.$^7$ ............................................. B29C 42/16
(52) U.S. Cl. .................... 700/200; 700/197; 425/140; 425/169
(58) Field of Search ............................. 264/40.1, 40.4, 264/328.1; 425/140, 169; 700/197, 200, 202, 203, 204, 205

(56) References Cited

U.S. PATENT DOCUMENTS

| | | | | |
|---|---|---|---|---|
| 4,816,197 A | * | 3/1989 | Nunn | 264/40.1 |
| 4,911,629 A | * | 3/1990 | Fujita | 264/40.1 |
| 4,979,641 A | * | 12/1990 | Turner | 222/153.03 |
| 5,176,858 A | * | 1/1993 | Tsukabe et al. | 264/40.1 |
| 5,195,029 A | * | 3/1993 | Murai et al. | 264/40.7 |
| 5,316,707 A | * | 5/1994 | Stanciu et al. | 264/328.14 |
| 5,350,547 A | * | 9/1994 | Yamaguchi et al. | 264/40.1 |
| 5,705,201 A | * | 1/1998 | Ibar | 264/572 |
| 5,914,884 A | * | 6/1999 | Gur Ali et al. | 264/328.1 |
| 6,051,170 A | * | 4/2000 | Kamiguchi et al. | 264/328.1 |

OTHER PUBLICATIONS

Website entitled "http://www.moldflow.com/Products/index.htm," owned by Moldflow Products (3 pages) relating to Production of Injection Moulded Parts.

* cited by examiner

Primary Examiner—Leo Picard
Assistant Examiner—Michael D. Masinick
(74) Attorney, Agent, or Firm—Thomas, Kayden, Horstemeyer & Risley, LLP

(57) ABSTRACT

An injection moulding system optimises the injection moulding process by removing selected articles (100) from a plurality of articles produced cyclically and tests a plurality of physical properties (105) of the removed articles including dimensions (106), weight (108) and gloss (107), together with a plurality of process parameters (109, 110) such as nozzle pressure and nozzle temperature. Adjustment of the process (121) is made automatically on the basis of up to three optimisers (114), including a case based reasoning optimiser (115), a fuzzy optimiser (116) and a rule based reasoning optimiser (117), in order to achieve pre-set article properties. The optimisers (114) can have confidence factors associated therewith, determined on the effect of previous process adjustments.

15 Claims, 6 Drawing Sheets

INJECTION MOULDING SYSTEM AND METHOD THAT DETERMINE OPTIMUM INJECTION MOULDING CONDITIONS

The present invention seeks to provide improved injection moulding of plastics products.

Currently, a skilled operator of an injection moulding machine sets the processing conditions and makes alterations if necessary (e.g. due to batch to batch variations in the raw material, or change in room temperature or humidity). The need to make changes is identified by inspection (visual as well as from limited off non-automatic line testing).

The cost of labour to carry out the alterations and the inspection is a problem. In addition, scrap still occurs (e.g. 5% would not be atypical), so the current technique of manual adjustment is far from perfect. Some materials are particularly difficult to process (e.g. recycled PVC) and would benefit from more careful control. Also cycle times are not always optimised which results in higher unit costs than necessary.

There is a requirement in the industry to reduce time to market for new products and to increase the production efficiency of injection moulded products through optimisation of cycle times. The need to process recycled material is also growing. Recycled materials where the polymer grade is not known or is not consistent produce quality control problems.

The present invention seeks to provide improved injection moulding. Controlling the injection moulding process using in-process measurements ensures the high quality of products. Furthermore, continuous monitoring of process conditions and materials properties can lead to reduced costs and higher levels of manufacturing efficiency, thereby improving industrial competitiveness.

The present invention further seeks to provide a system for automatically determining optimum injection moulding conditions.

According to a first aspect of the present invention there is provided a method of controlling a process for manufacturing injection moulded articles using an injection moulding machine including testing predetermined physical properties of selected articles; determining predetermined properties of the process; and adjusting the process parameters set on the injection moulding machine to achieve pre-set values of the physical properties of the articles for subsequent articles manufactured by the process.

Preferably, the testing the selected articles is carried out during the process within a predetermined number of cycles. The testing the selected articles may be carried out by an automated system.

Advantageously, the testing step includes testing for one or more of the dimensions, weight, gloss, colour, hardness, stiffness and impact resistance of the removed articles and the determining step includes obtaining one or more of hydraulic pressure, nozzle temperature, nozzle pressure, nozzle pressure drop. The determining step may include in situ real time determination of the viscosity of the injection material.

Preferably, the determining step includes obtaining automatically one or more of the following in-line process measurement points:

a) position of screw/piston at the beginning of an injection phase;
b) nozzle pressure at the end of a filling phase;
c) position of the screw at the end of the filling phase;
d) maximum nozzle pressure at the end of the injection phase;
e) screw position at a cross-over point where the process changes from keeping screw/piston velocity constant to keeping hydraulic pressure constant;
f) nozzle pressure at the cross-over point;
g) nozzle pressure integral during one cycle; and
h) position of the screw at the end of the holding phase.

The tested physical properties of the selected articles are advantageously stored in memory together with a machine cycle count number.

In the preferred embodiment, the adjusting step includes using one or more process optimisers for setting the injection moulding process. The optimisers may be artificial intelligence programs and may include one or more of: a) a case based reasoning optimiser; b) a fuzzy optimiser; and c) a rule based reasoning optimiser.

The case based reasoning optimiser preferably uses previous removed article data and correction data and measurements of subsequently removed tested articles to determine the most appropriate adjustments.

The adjusting step preferably makes adjustments to the process on the basis of confidence coefficients associated with each possible adjustment suggested by the optimisers. In an embodiment, the confidence coefficients are determined on the basis of the effect of previous adjustments.

According to a second aspect of the present invention there is provided an injection moulding system comprising: an injection moulding machine; a data collector; a process controller; wherein means are provided for supplying process data from the injection moulding machine to the data collector where it is compiled with product data and wherein the process controller includes means for evaluating the process and product data and altering the settings of the injection moulding machine.

Preferably, the system includes automated product data collection means which provides the product data to the data collector.

Advantageously, the injection moulding machine includes a nozzle with temperature and pressure sensors which obtain process data.

The nozzle preferably has a bore with a constriction and two pressure sensors disposed at either end of the constriction to provide pressure difference data. The pressure difference data together with the screw/piston speed, the cross-section of the bore and the distance between the pressure sensors provide a measurement of the viscosity of the fluid being moulded.

The preferred embodiment can automatically optimise the settings of injection moulding machines using automatic measurement of processing parameters (such as viscosity), product properties (such as weight, gloss and dimensions) and novel artificial intelligence computing software.

Such automatic control of the injection moulding machine can produce products within specification even when the raw material and/or room temperature/humidity/dust levels are changing, or when optimum processing conditions are not known, e.g. when the product is being moulded for the first time.

In a practical embodiment, an injection moulding system optimises the injection moulding process by removing selected articles from a plurality of articles produced cyclically and tests a plurality of physical properties of the removed articles including dimensions, weight and gloss, together with a plurality of process parameters. Adjustment of the process is made automatically on the basis of three optimisers, including a case based reasoning optimiser, a fuzzy optimiser and a rule based reasoning optimiser, in order to achieve pre-set article properties. The optimisers have confidence factors associated therewith, determined on the effect of previous process adjustments.

Embodiments of the present invention is described below, by way of example only, with reference to the accompanying drawings, in which.

Products are manufactured in an injection moulding machine on a semi-continuous basis. Polymer beads are fed into the machine and melted. The molten polymer is forced through a constriction in a nozzle into a mould. The mould shapes the product and after the cooling phase it can be taken out.

In a first embodiment of the described system, process and product properties are measured automatically during the operation of the injection moulding process. The data from of the process and product properties are acquired and stored and processed by at least one artificial intelligence process referred to as an optimiser. Problems are identified and if more than one optimiser has been used, a decision is made as to the results of which optimiser should be used. A control system then controls various operating parameters of the injection moulding process, thereby providing a control loop in the process to amend machine parameters during the moulding process.

In a second embodiment, the product properties are not measured during the injection moulding process. Trials are used to establish the mathematical relationships between the product properties (which are measured off-line), in-line process data and the machine settings. In-line process data are then used and the analysis, optimisation and control steps are carried out as described for the fist embodiment.

Figure 1:
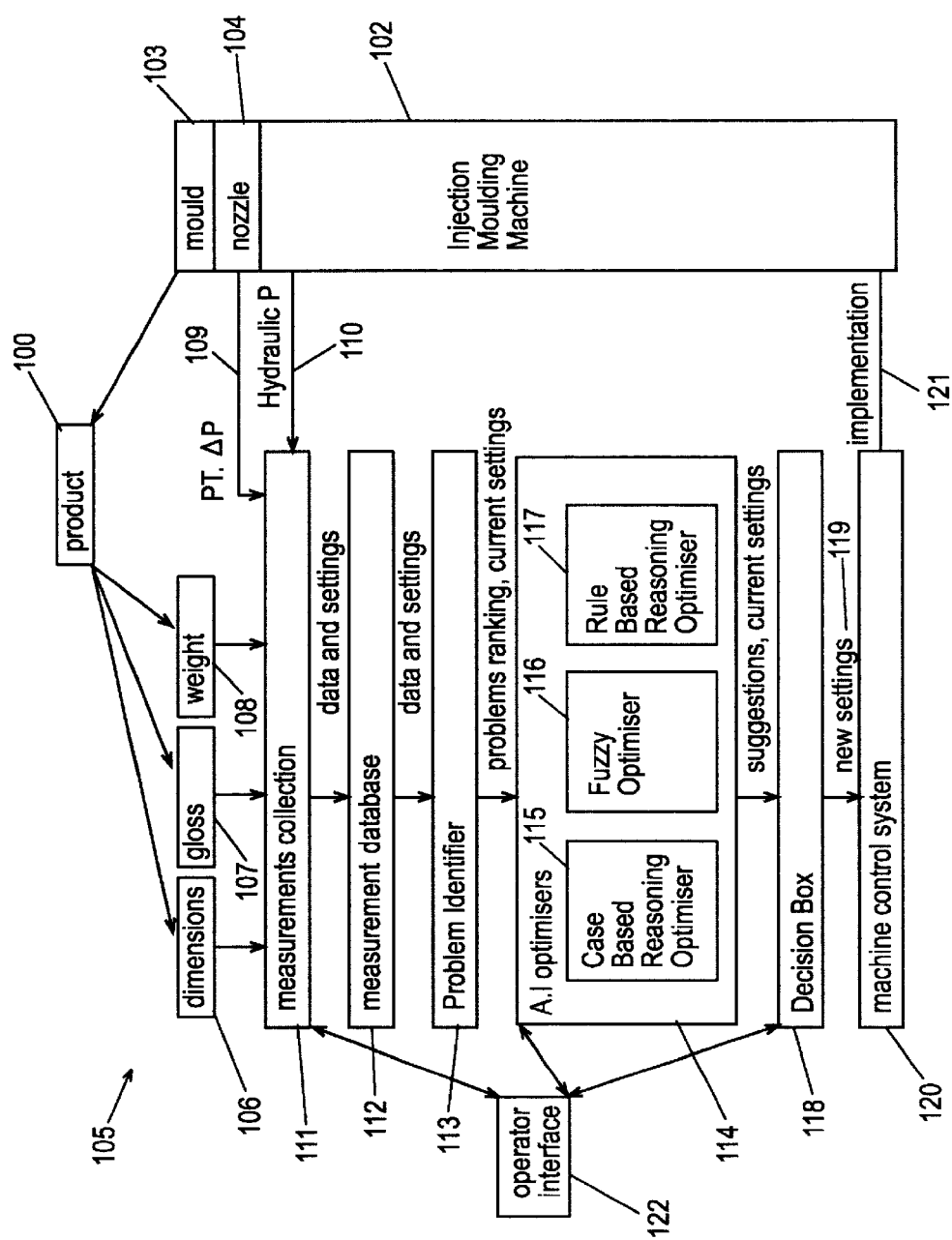
FIG. 1 is a functional diagram of an injection moulding process in accordance with the present invention.

Referring to FIG. 1, a flow diagram is shown illustrating the described system. A product 100 is provided which has been produced by an injection moulding machine 102. The injection moulding machine 102 has a mould 103 and a nozzle 104.

Product data 105 in the form of, for example, product dimensions 106, gloss 107 and product weight 108, are determined. The determination of the product data 105 can be carried out in-line in the injection moulding process using automated measuring procedures during the process. Alternatively, product data 105 can be determined off-line and input into the process.

Process data 109 is obtained during the injection moulding process from the injection moulding machine 102. In particular, data relating to pressure, temperature and pressure drop is obtained from the nozzle 104 of the injection moulding machine 102 as described in detail below. Process data is also obtained in the form of the hydraulic pressure 110 from the injection moulding machine 102.

The product data 105 and the process data 109 are collected in a measurements collection 111. The product data 105 and process data 109, 110 are input into a measurement database 112.

The data set from the measurement database 112 is stored in a program called a problem identifier 113. In order to minimise the effort for configuration the problem identifier 112 converts all quality characteristics into standardised numbers. The data set is then input to at least one artificial intelligence optimiser 114. In FIG. 1 and in the embodiment described below, three optimisers 114 are used each processing the input data and suggesting new settings for the injection moulding machine 102. Less than or more than three optimisers 114 could be used.

The three optimisers 114 are a case based reasoning optimiser 115, a fuzzy optimiser 116 and a rule based reasoning optimiser 117. Further details of the optimisers 114 are given below.

The suggestions of the optimisers 114 and the current settings are input into a decision box 118 and the new settings 119 for the injection moulding machine 102 are determined. The new settings 119 are input to a machine control system 120 which implements 121 the new settings in the injection moulding machine 102.

An operator interface 122 provides an interface with the measurements collection 111, the optimisers 114 and the decision box 118.

Figure 2:
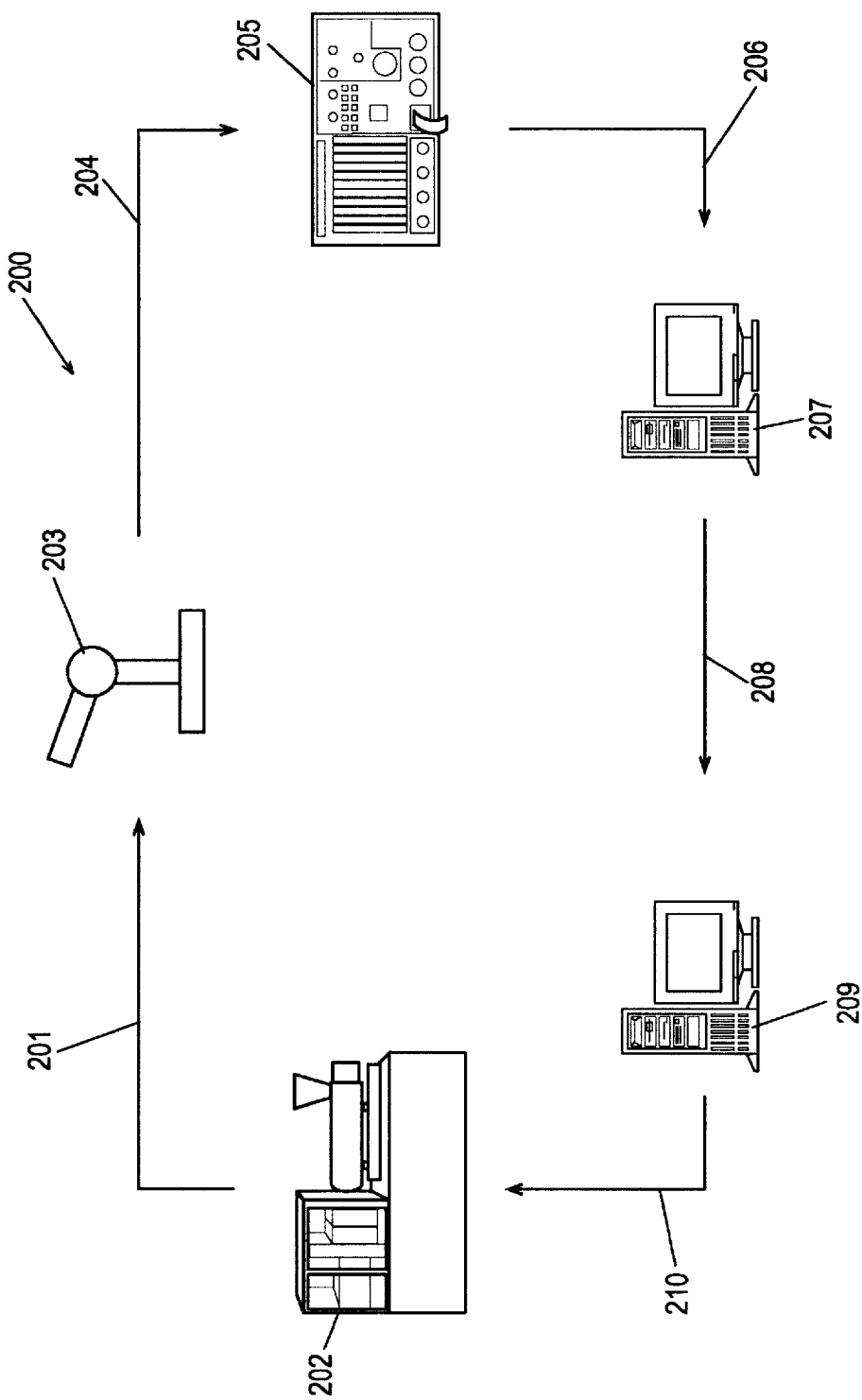
FIG. 2 is a diagram of the cycle of an injection moulding process in accordance with the present invention.

Referring to FIG. 2, a schematic diagram is shown of the components of the first embodiment of the system. The automated process is shown as a cycle 200. The process includes automatic valuation of the quality characteristics of the produced parts and automatic changing of the machine settings depending on the valuation of the quality characteristics.

The cycle 200 takes produced parts 201 from an injection moulding machine 202 and a robotic system 203 transports 204 the produced parts automatically to different measuring systems 205. The robotic system 203 can de-mould injection moulding parts from a stationary or moving mould half. The robotic system 203 is controlled by a programmable controller.

The measuring systems 205 can include a balance for weighing a produced part, a gloss meter for determining the gloss of the surface of a produced part and a dimensions gauge for measuring the dimensions of a produced part using a high resolution camera. Other forms of measuring system 205 can also be provided.

The cycle 200 forwards the data set 206 of measuring systems 205 to a data acquisition computer 207. The data acquisition computer 207 collects all the data which are important for the optimisation of an injection moulding process. The data acquisition computer 207 also has inputs from the injection moulding machine 202 relating to the process data.

When a data set is complete with all the data from the components collected, the data set is transferred 208 to an optimiser computer 209. In order to calculate a new machine setting, the optimiser computer 209 needs the quality characteristics of the produced product and the process parameters from the injection moulding machine and the nozzle.

The optimiser computer 209 arrives at a set of values 210 for the settings for the injection moulding machine 202 and the values are communicated to the machine 202. The cycle 200 then starts again with parts produced by the injection moulding machine 202 with the altered settings being transported by the robotic system 203 for measuring.

Figure 3:
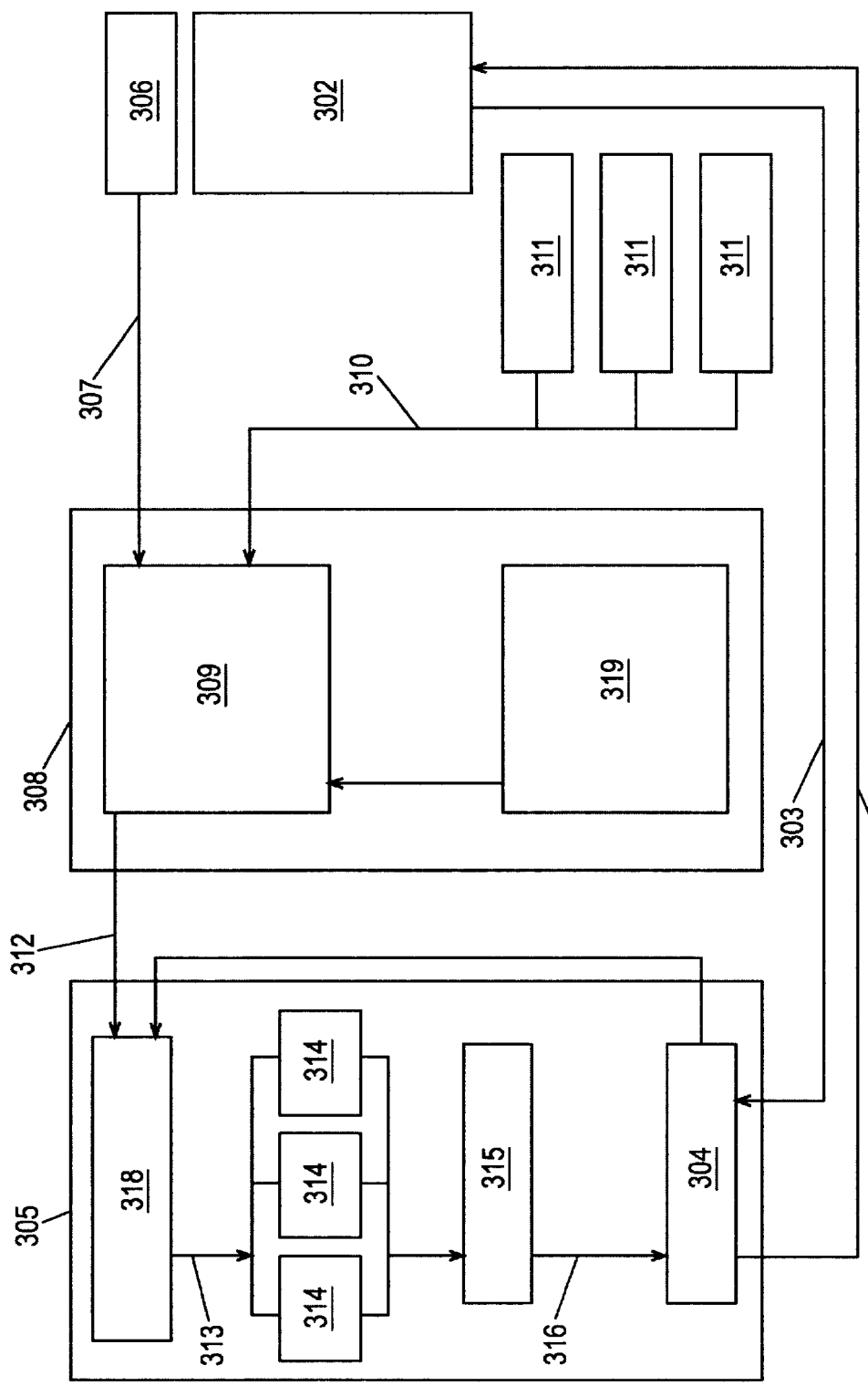
FIG. 3 is a block diagram of the components of an injection moulding process in accordance with the present invention.

FIG. 3 shows in more detail the inter-relation of the components of the system. An injection moulding machine 302 sends process parameters 303 to a controller 304 in the optimiser computer 305. A nozzle 306 of the injection moulding machine 302 sends process parameters 307 to a database 309 of the data acquisition computer 308. The database 309 also receives quality characteristic data 310 from product measurement systems 311 and additional parameters can be input via a program 319 in the data acquisition computer 308.

The database 309 of the data acquisition computer 308 sends a data set 312 to the optimiser computer 305. The optimiser computer 305 has a problem identifier program 318 which standardises the data set 312 and inputs a full data set 313 to at least one artificial intelligence optimiser 314. The results of the optimisers 314 are sent to a decision box program 315 which decides which suggestion by the optimisers 314 is the most successful and determines new machine settings 316. The new machine settings 316 are sent to the controller 304 which communicates with the injection moulding machine 302 by sending the setting values 317.

Figure 4:
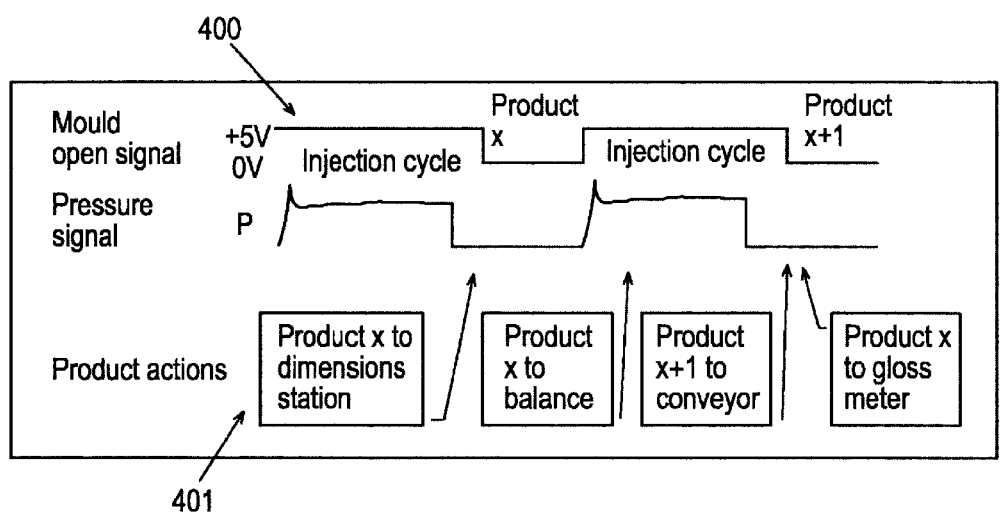
FIG. 4 shows a preferred processing sequence for a controlled injection moulding machine.

While subsequent injection cycles are performed, products once every n cycles (n represents a chosen number of cycles to skip) can be taken by the robotic system through the several measurement stations to collect automatically critical product properties like dimensions, weight and gloss. An example is given in FIG. 4 of the relationship between the injection cycles 400 and the product actions 401. These properties can then be optimised by the system to achieve pre-set values that are desired for these products.

The system uses in-line data from the nozzle and hydraulic pressure curves from the injection moulding machine. The construction of the nozzle makes it possible to collect some important process parameters without significantly disturbing the production of articles. The melt temperature of the polymer used in the injection moulding machine can be measured and the melt pressure depending on the position of the screw in the nozzle can be collected. A constriction in the nozzle leads to a pressure drop, $\Delta P$, which holds information on the viscosity of the polymer melt.

Figure 5:
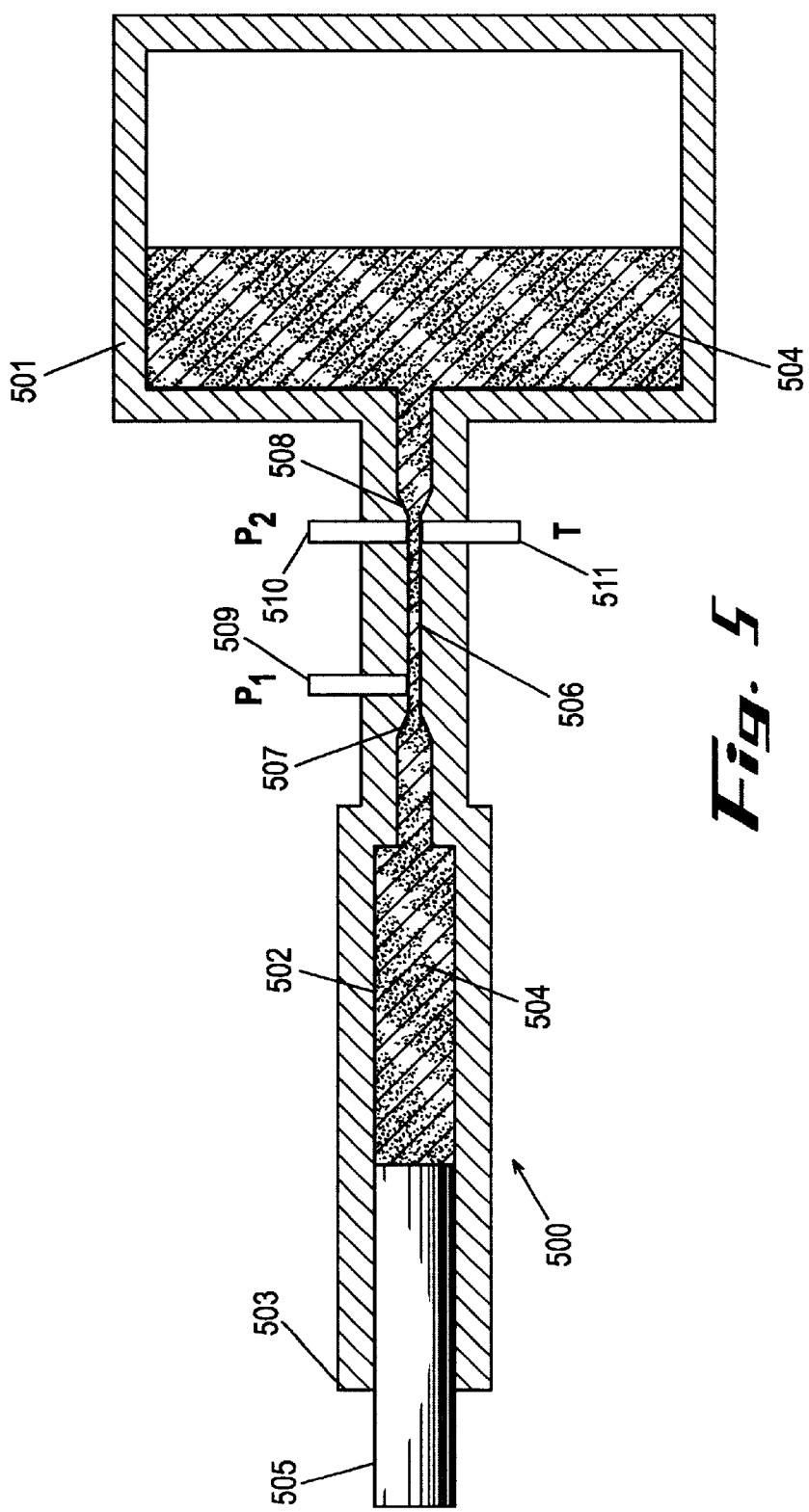
FIG. 5 is a cross-section of a nozzle and mould of an injection moulding process in accordance with the present invention.

FIG. 5 shows a diagrammatic cross-section of a nozzle 500 and mould 501. The nozzle 500 has a bore 502 of circular cross-section. A first end 503 of the nozzle has a screw 505 which can be moved relative to the longitudinal direction of the bore 502 to reduce the volume within the bore 502 and thereby inject polymer 504 into the mould 501.

The bore 502 of the nozzle 500 has a constriction 506 part way along the bore 502. The construction 506 is a length of the bore with a smaller circular cross-section to the rest of the bore 502. The constriction 506 has a first end 507 at the screw end of the constriction 506 and a second end 508 proximal the mould 501.

Pressure sensors 509, 510 are provided at the first and second ends 507, 508 of the constriction 506 in the bore 502. The pressure sensors 509 can be piezoelectric pressure sensors. A temperature sensor 511 is provided at the second end 508 of the constriction 506 proximal the mould 501. The temperature sensor 511 can be an infra-red temperature sensor. The flow through the nozzle 500 generates a pressure drop $\Delta P$ that is measured by the two pressure sensors 509, 510. The pressure measurements when combined with the cross-section of the bore 502 and the screw speed provide the data from which viscosity is calculated. The temperature at which the viscosity is determined is also measured 511.

A nozzle pressure curve can detect the following points and transitions during the injection phase of the moulding cycle:

1. Start of injection phase/Start of filling phase;
2. End of filling phase;
3. Filling to packing phase transition;
4. Switch over point;
5. Start of holding phase.

Figure 6:
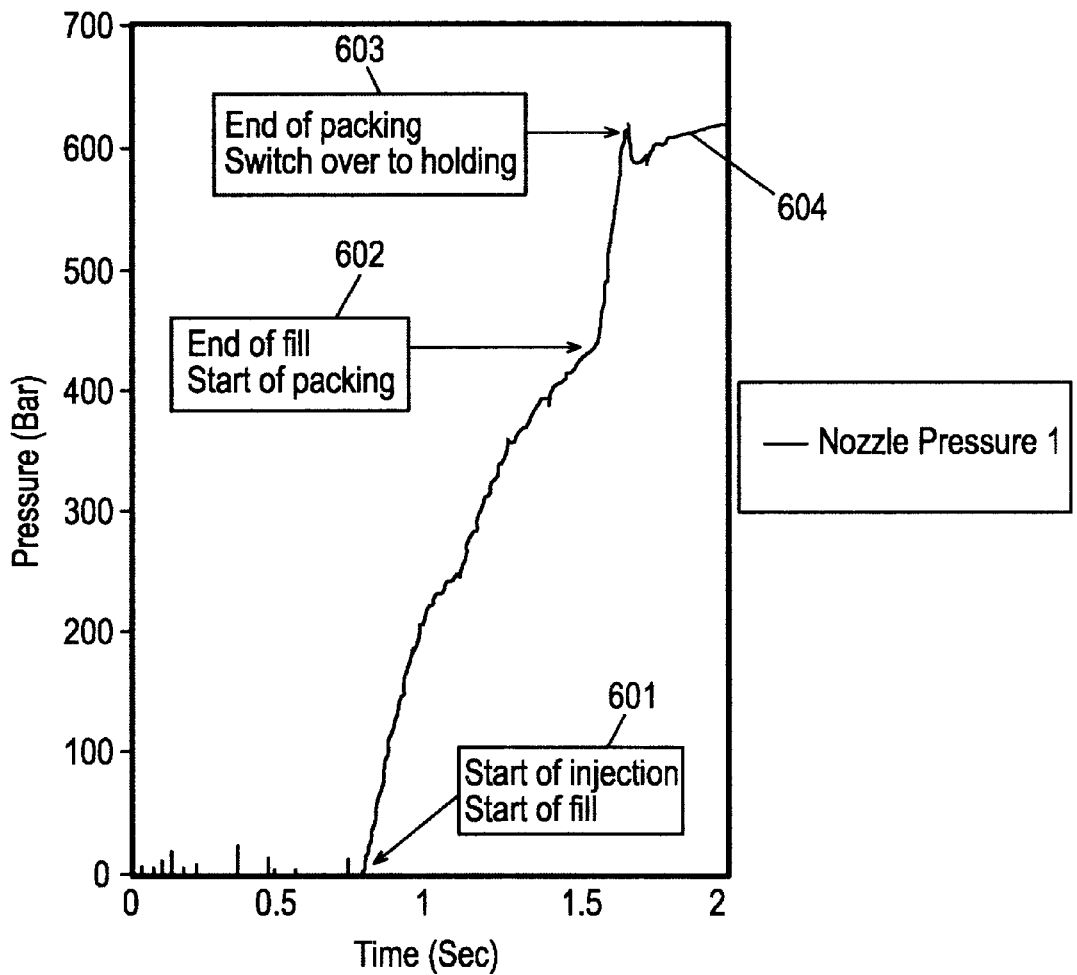
FIG. 6 shows in graphical form an example of nozzle pressure during the injection phase in an injection cycle.

An example of a pressure trace collected form a nozzle is shown in FIG. 6 for polypropylene. At the start of the injection phase there is a sharp increase in the nozzle pressure as the mould is being filled 601. The end of the filling phase is denoted by an increased resistance to flow which can be detected by a change in gradient of the curve 602. This is followed by the packing phase where additional material is forced into the mould to allow for shrinkage as the part is cooled. When a maximum pressure 603 has been achieved switch over to the holding phase 604 occurs where the part cools.

Hydraulic pressure data and screw position data are collected from the injection moulding machine itself and from the nozzle temperature T, pressure P and the pressure drop $\Delta P$ are collected.

From the product and process data collected, the following in-line process measurement points can be determined automatically using the data analysis software:

a) position of screw/piston at the beginning of the injection phase;
 b) nozzle pressure at the end of the filling phase;
 c) position of the screw at the end of the filling phase;
 d) maximum nozzle pressure at the end of the injection phase;
 e) screw position at the cross-over point (this is the point where the injection moulding machine changes from keeping the screw/piston velocity constant to keeping the hydraulic pressure constant;
 f) nozzle pressure at the cross-over point;
 g) nozzle pressure integral during one cycle (from beginning of fill to end of fill);
 h) position of the screw at the end of the holding phase;

The following product data can also be determined automatically:

I. weight
 II. gloss
 III. dimensions

These data points are passed on to the database in the data acquisition computer for future reference together with a machine cycle count number. The problem identifier in the optimiser computer receives the data from the database and compares values of weight, gloss and dimensions with ideal values and allowed tolerances which are kept in a reference file. A scoring value is calculated from zero to five. The value zero indicates the achieved product property is exactly correct, one that the value is still within acceptable limits and increasingly severe deviations are reflected in higher numbers. These rankings and the setting values are passed to at least one optimiser.

Three optimisers are used in this example.

1. A rule based reasoning optimiser is an optimiser that uses predefined rules to change product properties.
2. A case based reasoning optimiser puts the different cases of properties and settings in a multi-dimensional parameter space and tries to deduce ways to go to the position in parameter space that is considered to be ideal by correlation functions rather like pattern recognition in two dimensions. This is a learning unit and will become more effective the more cases that are processed.
3. A fuzzy optimiser uses fuzzy logic to come to a suggestion (e.g. based on expertise obtained from a human expert).

The optimisers find the machine settings that provide the closest quality features to the desired quality features. The optimisers start with the actual injection moulding machine setting and after a complete valuation, the optimiser calculates a new setting and sends it to the decision box.

The settings that can be changed in an injection moulding machine include the change over point, the plasticising stroke, back pressure, plasticising speed, injection speed, holding pressure, holding pressure time, cylinder temperatures, nozzle temperature, clamping force, etc.

The optimisers are not just used for problematic processes. The quality of a process which already has a high quality level can be improved, including reducing cycle time.

The three suggestions from the three optimisers are passed to a decision box which will reach a decision in terms of changed machine settings based on the suggestions given and the confidence coefficients associated with each suggestion. The machine control system will finally implement the decision in the injection moulding machine. The decision box keeps track of the effectiveness of the optimisers' suggestions. This is reflected in confidence coefficients for the optimisers that set their relative influence for the decisions in cycles to come.

An alternative approach to solving this optimisation problem is to build a mathematical model of the injection moulding process, input the polymer properties and the product geometry and predict what the processing parameters should be to obtain an acceptable product. This approach is taken by Moldflow and C-Mold for example. A variation on this theme is to run the computer simulation several times with different processing conditions (e.g. temperature) seeking a particular outcome (e.g. minimum cycle time).

In an embodiment in which there is a single optimiser, the decision box is not required as the settings suggested by the optimiser will be sent to the control system.

The described embodiments could be modified to measure automatically other product properties such as colour, hardness or even impact resistance.

The system could be used for the injection moulding of other materials (e.g. ceramics, rubber, wax, metals). It can also be applied to other processes in the plastics industry, including, thermoforming, blow moulding, compression moulding, extrusion and gas-assisted injection moulding.

The system can also be used for other processes outside the plastics industry, which require automatic product measurement, process monitoring and control and artificial intelligence to find the optimum settings or where the properties of the raw material being processed are variable and the properties of the commercial product are required to be consistent and where the relationship between the input parameters and the product properties is not known or is too complex for simple optimisation.

The possibility of having 100% inspection can provide better quality assurance.

The system can also adjust to changes in the raw material or processing environment avoiding production of scrap. This advantage is believed to be particularly useful for recycling waste plastic.

The preferred system has a built in ability to learn how to process polymers, so that its optimisation strategy will become more efficient with time.

Improvements and modifications can be made to the foregoing without departing from the scope of the present invention.

What is claimed is:

1. A method of controlling a process for manufacturing injection moulded articles using an injection moulding machine including testing predetermined physical properties of selected articles manufactured by the process; measuring during the process predetermined properties of the process; and adjusting the process parameters set on the injection moulding machine to achieve pre-set values of the physical properties of the articles for subsequent articles manufactured by the process; wherein at least some of the process parameters are measured from a nozzle of the injection moulding machine.

2. A method according to claim 1, wherein the testing the selected articles is carried out during the process within a predetermined number of cycles.

3. A method according to claim 1, wherein the testing the selected articles is carried out by an automated system.

4. A method according to claim 1, wherein the testing step includes testing for one or more of the dimensions, weight, gloss, colour, hardness, stiffness and impact resistance of the removed articles.

5. A method according to claim 1, wherein the measuring step includes obtaining one or more of hydraulic pressure, nozzle temperature, nozzle pressure, nozzle pressure drop.

6. A method according to claim 1, wherein the measuring step includes determining viscosity of the injection material.

7. A method according to claim 1, wherein the measuring step includes obtaining automatically one or more of the following in-line process measurement points:
   a) position of screw/piston at the beginning of an injection phase;
   b) nozzle pressure at the end of a filling phase;
   c) position of the screw at the end of the filling phase;
   d) maximum nozzle pressure at the end of the injection phase;
   e) screw position at a cross-over point where the process chances from keeping screw/piston velocity constant to keeping hydraulic pressure constant;
   f) nozzle pressure at the cross-over point;
   g) nozzle pressure integral during one cycle; and
   h) position of the screw at the end of the holding phase.

8. A method according to claim 1, wherein the tested physical properties of the selected articles are stored in memory together with a machine cycle count number.

9. A method according to claim 1, wherein the adjusting step includes using one or more process optimisers for setting the injection moulding process.

10. A method according to claim 9, wherein the optimiser or optimisers are artificial intelligence programs and include one or more of:
   a) a case based reasoning optimiser;
   b) a fuzzy optimiser; and
   c) a rule based reasoning optimiser.

11. A method according to claim 10, wherein the case based reasoning optimiser uses previous removed article data and correction data and measurements of subsequently tested articles to determine the most appropriate adjustments.

12. A method according to claim 9, wherein the adjusting step makes adjustments to the process on the basis of confidence coefficients associated with each possible adjustment suggested by the optimisers.

13. A method according to claim 12, wherein the confidence coefficients are determined on the basis of the effect of previous adjustments.

14. An injection moulding system comprising:
   an injection moulding machine;
   a data collector;

a process controller; and wherein means are provided for measuring and supplying process data from the injection moulding machine to the data collector where it is compiled with product data and wherein the process controller includes means for evaluating the process and product data and altering the settings of the injection moulding machine; and wherein the means for measuring the process data includes a nozzle with temperature and pressure sensors and a bore with a constriction and wherein two pressure sensors are disposed at either end of the constriction to provide pressure difference data.

15. An injection moulding system according to claim 14, wherein the system includes automated product data collection means which provides the product data to the data collector.

* * * * *